United States Patent
Sannohe et al.

(10) Patent No.: US 7,033,030 B2
(45) Date of Patent: *Apr. 25, 2006

(54) PROJECTION-TYPE DISPLAY APPARATUS

(75) Inventors: Shinya Sannohe, Neyagawa (JP); Hideki Ishinaga, Ibaraki (JP); Takamasa Yoshikawa, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/159,717

(22) Filed: Jun. 23, 2005

(65) Prior Publication Data

US 2005/0237496 A1 Oct. 27, 2005

Related U.S. Application Data

(63) Continuation of application No. 10/470,977, filed as application No. PCT/JP02/04013 on Apr. 23, 2002.

(30) Foreign Application Priority Data

Apr. 25, 2001 (JP) .............................. 2001-127910

(51) Int. Cl.
*G03B 21/14* (2006.01)
*G03B 21/28* (2006.01)
*G02B 26/02* (2006.01)
*G02B 9/08* (2006.01)
*G02F 1/00* (2006.01)

(52) U.S. Cl. .......................... 353/97; 353/37; 353/99; 359/227; 359/739; 348/771; 349/7

(58) Field of Classification Search ................... 353/97, 353/31, 33, 34, 37, 60, 61, 81, 82, 98, 99, 353/122; 355/53, 67, 71, 77; 349/7, 8, 10, 349/86, 113; 359/233, 277, 738, 739; 356/400, 356/401; 362/268; 348/771
See application file for complete search history.

(56) References Cited

U.S. PATENT DOCUMENTS

| 5,442,414 A | 8/1995 | Janssen et al. ................. 353/98 |
| 5,743,612 A | 4/1998 | Matsuda et al. .............. 353/97 |
| 5,760,875 A | 6/1998 | Daijogo et al. ................ 353/31 |

(Continued)

FOREIGN PATENT DOCUMENTS

JP   8-129138   5/1996

(Continued)

*Primary Examiner*—W. B. Perkey
*Assistant Examiner*—Rochelle Blackman
(74) *Attorney, Agent, or Firm*—Hamre, Schumann, Mueller & Larson, P.C.

(57) ABSTRACT

An illuminating optical system for focusing a radiant light of a light source (1) onto a reflecting light valve (6) and a projection lens (7) for magnifying and projecting a reflected light from the reflecting light valve (6) onto a screen are provided, a diaphragm (31) is disposed at a substantially conjugate position of an entrance pupil of the projection lens (7) on an optical path of the illuminating optical system, the diaphragm (31) has an opening whose area is changed by a light-shielding member, and a shape of a shielded portion of the diaphragm (31) shielded by the light-shielding member is rotationally asymmetric to an optical axis (12) of the illuminating optical system. Accordingly, shielding of necessary light can be better avoided compared with a diaphragm for changing the light-shielding area in a rotationally symmetric manner, for example, a diaphragm for narrowing the opening concentrically, making it possible to improve contrast performance while minimizing brightness reduction.

1 Claim, 11 Drawing Sheets

U.S. PATENT DOCUMENTS

| | | | |
|---|---|---|---|
| 6,220,730 B1 * | 4/2001 | Hewlett et al. | 362/297 |
| 6,264,333 B1 | 7/2001 | Iizuka | 353/101 |
| 6,357,878 B1 | 3/2002 | Sawamura | 353/33 |
| 6,371,617 B1 | 4/2002 | Nishida et al. | 353/122 |
| 6,382,799 B1 | 5/2002 | Nishikawa et al. | 353/122 |
| 6,454,417 B1 | 9/2002 | Takamoto et al. | 353/33 |
| 6,607,277 B1 | 8/2003 | Yokoyama et al. | 353/52 |
| 6,607,280 B1 | 8/2003 | Koyama et al. | 362/31 |
| 6,637,894 B1 | 10/2003 | Dewald et al. | 353/97 |
| 2002/0027720 A1 | 3/2002 | Nishikawa et al. | 359/678 |
| 2002/0036833 A1 | 3/2002 | Miyata et al. | 359/651 |
| 2002/0044261 A1 | 4/2002 | Ouchi et al. | 353/31 |

FOREIGN PATENT DOCUMENTS

| | | |
|---|---|---|
| JP | 9-5000738 | 9/1997 |
| JP | 2000-47326 | 2/2000 |
| JP | 2000-206451 | 7/2000 |
| JP | 2000-206455 | 7/2000 |
| JP | 2000-258703 | 9/2000 |
| JP | 2000-338428 | 12/2000 |
| JP | 2001-42256 | 2/2001 |
| JP | 2002-6257 | 1/2002 |
| JP | 2002-72128 | 3/2002 |
| JP | 2002-107662 | 4/2002 |
| JP | 2002-214564 | 7/2002 |

* cited by examiner

FIG. 11B

PROJECTION-TYPE DISPLAY APPARATUS

This application is a continuation of application Ser. No. 10/470,977, filed Jul. 31, 2003, which is a National Stage application of PCT/JP02/04013, filed Apr. 23, 2002, which applications are incorporated herein by reference.

TECHNICAL FIELD

The present invention generally relates to a projection-type display apparatus that magnifies an optical image formed on a light valve and projects it onto a screen.

BACKGROUND ART

There has been a conventionally well-known method for obtaining a large-screen image, in which an optical image corresponding to a video signal is formed on a light valve, irradiated with light, and then magnified and projected onto a screen by a projection lens. The use of a reflecting light valve as the light valve can achieve both a high resolution and a high pixel aperture ratio, making it possible to display a highly-bright projected image with highly efficient light utilization.

Figure 10:
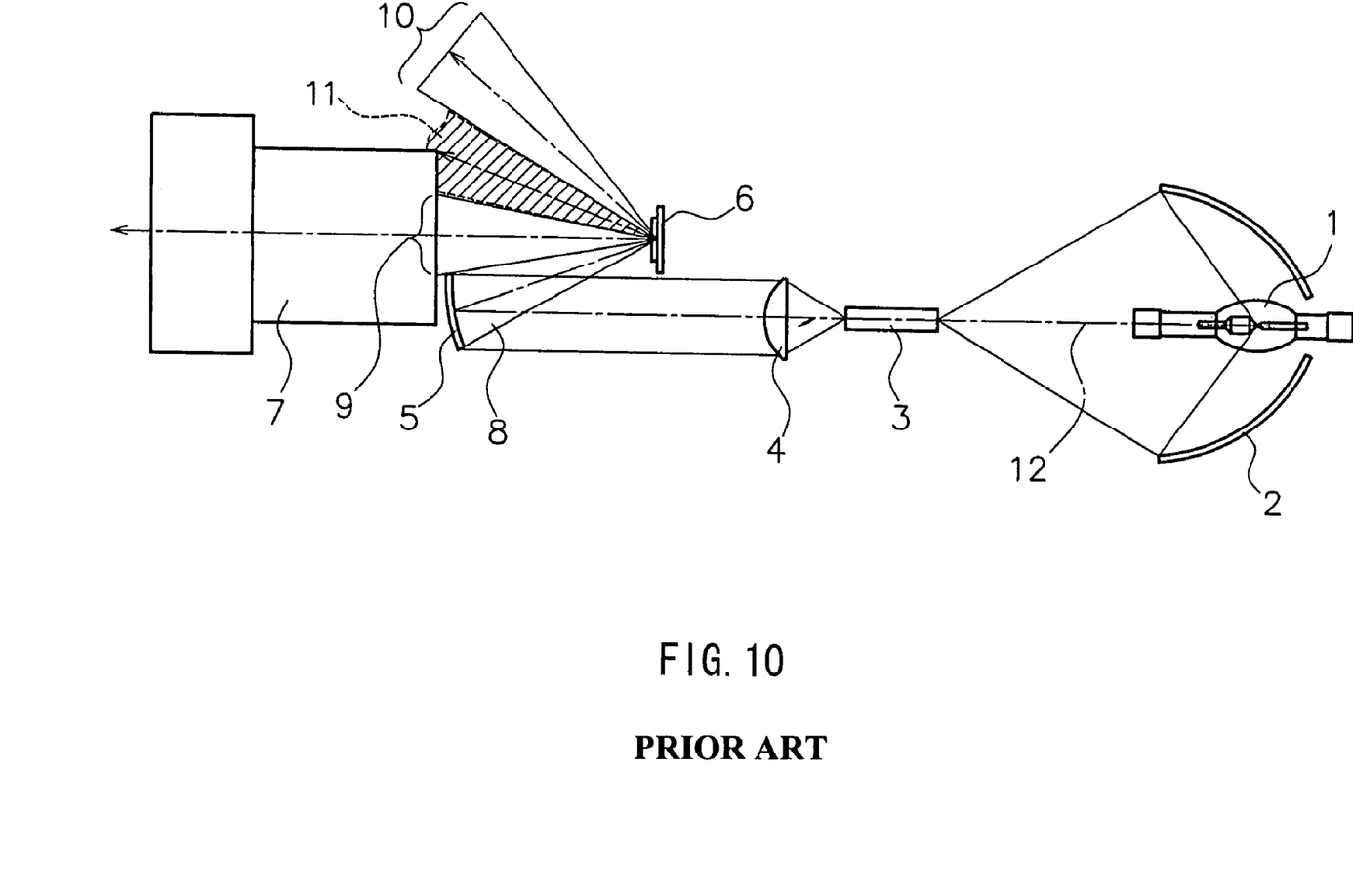
FIG. 10 shows a schematic configuration of an example of a conventional projection-type display apparatus.

As a conventional example, FIG. 10 illustrates a configuration of an optical system of a projection-type display apparatus using a reflecting light valve. An illuminating optical system for focusing and illuminating light emitted from a lamp 1 as a light source onto a reflecting light valve 6 includes a concave mirror 2, a quadratic rod prism 3 whose cross-section has substantially the same aspect ratio as an effective display surface of the reflecting light valve 6, a condenser lens 4 and a focusing mirror 5.

The concave mirror 2 has a reflecting surface with an elliptical cross-section and has a first focus and a second focus. The lamp 1 is disposed so that the center of its light-emitting body is in the vicinity of the first focus of the concave mirror 2, and the rod prism 3 is disposed so that its light entrance surface is in the vicinity of the second focus of the concave mirror 2. In addition, the concave mirror 2 is obtained by forming on an inner surface of a glass base an optical multilayer film that transmits infrared light and reflects visible light.

Light emitted from the lamp 1 is reflected and focused by the concave mirror 2 and forms an image of the light-emitting body of the lamp 1 at the second focus of the concave mirror 2. The light-emitting body image of the lamp 1 is brightest near the center, which is close to an optical axis, and rapidly becomes darker toward the periphery, and thus there is ununiformity in brightness. To solve this problem, the entrance surface of the rod prism 3 is disposed in the vicinity of the second focus, incident light is subjected to multiple reflections on a side surface of the rod prism 3 to achieve brightness uniformity, and the exit surface of the rod prism 3 serves as a secondary surface light source to form an image on the reflecting light valve 6 by the subsequent condenser lens 4 and focusing mirror 5, thereby securing uniformity of the illuminating light.

Herein, the operation of the reflecting light valve 6 will be described referring to FIG. 11. The reflecting light valve 6 controls a traveling direction of light according to a video signal and forms an optical image by a change in a reflection angle. Mirror elements 21 corresponding respectively to pixels are formed in a matrix pattern, and each of the mirror elements 21 inclines ±θ° with respect to a plane 22 perpendicular to the optical axis of the projection lens by an ON signal for a white display and an OFF signal for a black display. After passing through a cover glass 23, an illuminating chief ray 24 enters and is reflected by the mirror element 21 and leaves the cover glass 23 again.

Figure 11A:
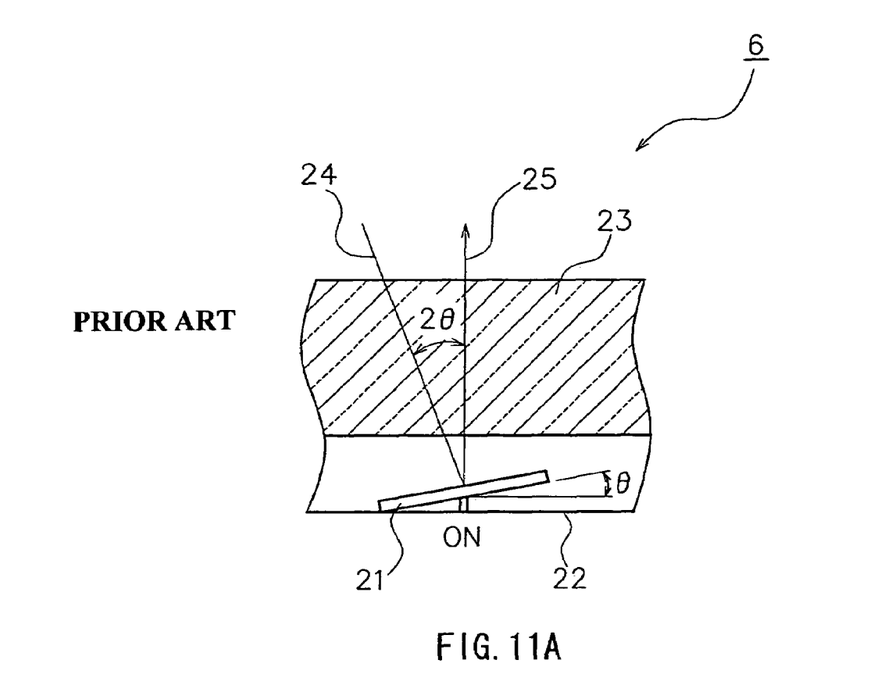
FIG. 11A illustrates an operation of a reflecting light valve at the time of an ON signal.

As shown in FIG. 11A, first, the incident angle of the illuminating chief ray 24 is set such that, at the time of the ON signal, an ON light chief ray 25 is reflected and travels along a direction perpendicular to the plane 22, that is, the optical axis of the projection lens. In this case, the illuminating chief ray 24 and the ON light chief ray 25 form an angle of 2θ. On the other hand, as shown in FIG. 11B, at the time of the OFF signal, an OFF light chief ray 26 is reflected and travels along a direction not reaching the projection lens, and the illuminating chief ray 24 and the OFF light chief ray 26 form an angle of 6θ.

As shown in FIG. 10, an illuminating light 8 entering the reflecting light valve 6 reaches the projection lens 7 as ON light 9 at the time of the ON signal or travels outside an effective diameter of the projection lens 7 as OFF light 10 at the time of the OFF signal. By controlling the time allocation of the ON light 9 and the OFF light 10 according to the video signal as described above, a projected image is formed on the screen.

Figure 11B:
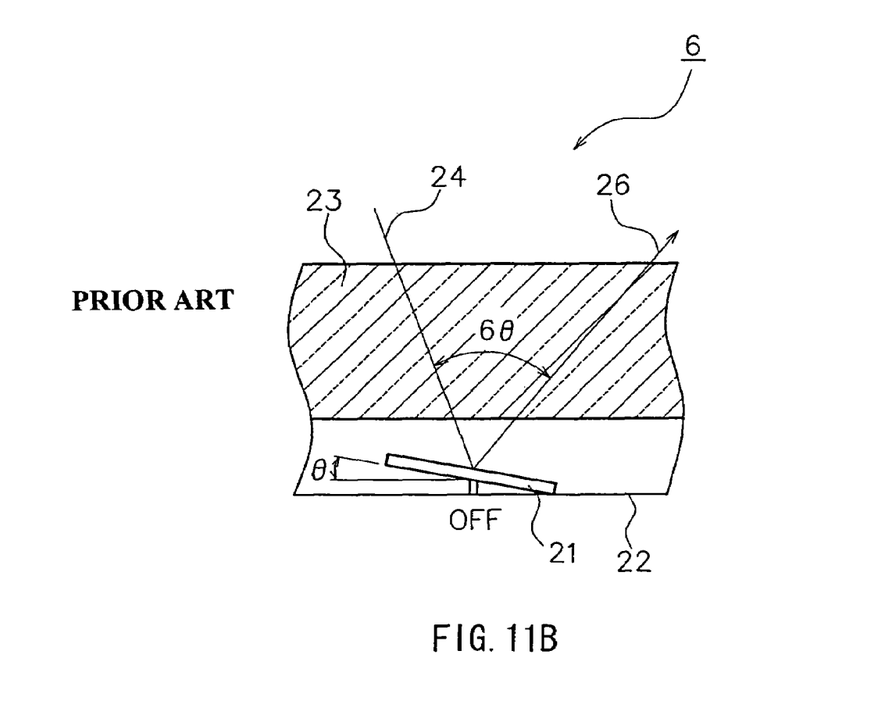
FIG. 11B illustrates the operation of the reflecting light valve at the time of an OFF signal.

However, reflected light generated at an interface of the cover glass 23 shown in FIG. 11 and the air as an external medium travels as unwanted reflection light 11, which is shown as hatching in FIG. 10, and partially enters the projection lens 7. Since this unwanted reflection light 11 travels similarly in both times of ON/OFF signals, it considerably reduces the quality of black display especially at the time of OFF traveling, causing a deterioration of contrast performance.

DISCLOSURE OF INVENTION

It is an object of the present invention to solve the conventional problem described above and to provide a projection-type display apparatus that improves contrast performance while avoiding shielding of necessary light so as to minimize brightness reduction.

In order to achieve the above-mentioned object, a projection-type display apparatus of the present invention includes a light source, a reflecting light valve, an illuminating optical system for focusing a radiant light of the light source onto the reflecting light valve, and a projection lens for magnifying and projecting a reflected light from the reflecting light valve onto a screen. A diaphragm is disposed at one of a position of an entrance pupil of the projection lens and a substantially conjugate position of the entrance pupil, the diaphragm is provided with an opening for shielding a part of the radiant light of the light source, and a shape of the opening is rotationally asymmetric to an optical axis of the illuminating optical system or the projection lens.

In accordance with the projection-type display apparatus described above, it becomes possible to improve the contrast performance while avoiding shielding of necessary light so as to minimize the brightness reduction.

It is preferable that the projection-type display apparatus described above further includes a light-shielding member, and a moving system of the light-shielding member. The shape of the opening of the diaphragm is a shape shielded by the light-shielding member, the shape shielded by the light-shielding member is rotationally asymmetric to the optical axis of the illuminating optical system or the projection lens, and the moving system can change an area of the opening by displacing the light-shielding member. In accordance with the above-described projection-type display apparatus, since shielding of necessary light can be better avoided compared with a diaphragm for shielding light in a rotationally symmetric manner, for example, a diaphragm for narrowing the opening concentrically, it is possible to improve contrast performance while minimizing brightness reduction. Moreover, the contrast performance and the optical output can be adjusted suitably.

Also, it is preferable to include further a prism for reflecting an illuminating light from the illuminating optical system toward the reflecting light valve and transmitting the reflected light from the reflecting light valve. In accordance with the above-described projection-type display apparatus, a compact illuminating optical system can be constructed, and unwanted reflection light generated at an interface of the prism can be cut while minimizing the brightness reduction.

Further, it is preferable that the number of the reflecting light valves is three, and the projection-type display apparatus further includes a first prism for reflecting an illuminating light from the illuminating optical system toward the reflecting light valves and transmitting the reflected light from the reflecting light valves, and a second prism for separating the illuminating light into three components of primary colors of red, blue and green and combining into one the three components that are reflected by the corresponding reflecting light valves. In accordance with the above-described projection-type display apparatus, a high-resolution full-color projected image can be displayed, and unwanted reflection light generated at interfaces of the first prism and the second prism can be cut while minimizing the brightness reduction.

Moreover, it is preferable that the reflecting light valve has an image formation surface and a transparent plate that is disposed on an exit side of the image formation surface and in parallel with the image formation surface.

Furthermore, it is preferable that the reflecting light valve is formed of a plurality of mirror elements that are arranged in a matrix pattern and control a reflecting direction of light according to a video signal.

Additionally, it is preferable that an illuminating light from the illuminating optical system obliquely enters the reflecting light valve, and that, when a reference position is a position of the light-shielding member at which a periphery of the illuminating light and that of an unwanted reflection light of the reflecting light valve come closest to each other, the light-shielding member can be moved in one direction from the reference position toward the optical axis by the moving system and a continuous movement in the one direction enlarges a light-shielding area of the diaphragm. In accordance with the above-described projection-type display apparatus, the unwanted reflection light from the reflecting light valve can be cut gradually from an optical axis side.

It also is preferable that the shape of the opening of the diaphragm is circular in an opened state.

Further, it is preferable that a shielded portion shielded by the light-shielding member has a substantially part-circular shape. In accordance with the above-described projection-type display apparatus, it is easy to form the shape of the shielded portion that is rotationally asymmetric to the optical axis.

Moreover, it is preferable that a side of the light-shielding member is a straight line that is parallel with a horizontal line passing through a point on the optical axis when the diaphragm is seen in a plane direction, and the shielded portion surrounded by the parallel straight line and an internal circumference of the opening of the diaphragm has the substantially part-circular shape.

Furthermore, it is preferable that a shielded portion shielded by the light-shielding member has a substantially crescent shape. In accordance with the above-described projection-type display apparatus, it is easy to form the shape of the shielded portion that is rotationally asymmetric to the optical axis.

Additionally, it is preferable that the light-shielding member has a circular opening, the shielded portion is formed by shifting a center of the circular opening with respect to that of the opening of the diaphragm, and the shielded portion surrounded by an internal circumference of the circular opening of the light-shielding member and that of the opening of the diaphragm has the substantially crescent shape.

It also is preferable that the light-shielding member has an opening whose inner diametral dimension is changeable and whose center is shifted with respect to the opening of the diaphragm, the shielded portion surrounded by an internal circumference of the opening of the light-shielding member and that of the opening of the diaphragm has the substantially crescent shape, and an area of the shielded portion is changed by changing the inner diametral dimension of the opening of the light-shielding member.

Further, it is preferable that when an upper portion is a part of the opening of the diaphragm above a horizontal line passing through a point on the optical axis and a lower portion is a part thereof below the horizontal line in a case where the diaphragm is seen in a plane direction, the opening of the diaphragm is shielded by the light-shielding member gradually from one of the upper portion and the lower portion toward the other so that a light-shielding area enlarges.

Moreover, it is preferable that a surface of the light-shielding member is formed of a metal or a dielectric multilayer film that reflects an incident light with a reflectance of at least 80%. In accordance with the above-described projection-type display apparatus, the amount of absorbed light can be suppressed, making it possible to prevent peripheral optical components from being damaged by radiant heat due to the rising surface temperature of the shielded portion.

Furthermore, it is preferable to include further a control system for controlling how much the light-shielding member is displaced by the moving system. The control system controls a light-shielding amount of the diaphragm so as to change according to a level of an input video signal. In accordance with the above-described projection-type display apparatus, for example, by giving priority to the contrast and the higher level of black in darker scenes and giving priority to the higher level of white in brighter scenes, it is possible to obtain a display performance with enhanced contrast.

Additionally, it is preferable that a light-shielding amount of the diaphragm is controlled from an outside of the apparatus. In accordance with the above-described projection-type display apparatus, it is possible to select suitably a projected image in which the brightness is important or that in which the contrast is important according to an intended use.

BEST MODE FOR CARRYING OUT THE INVENTION

The following is a description of embodiments of the present invention, with reference to the accompanying drawings.

First Embodiment

Figure 1:
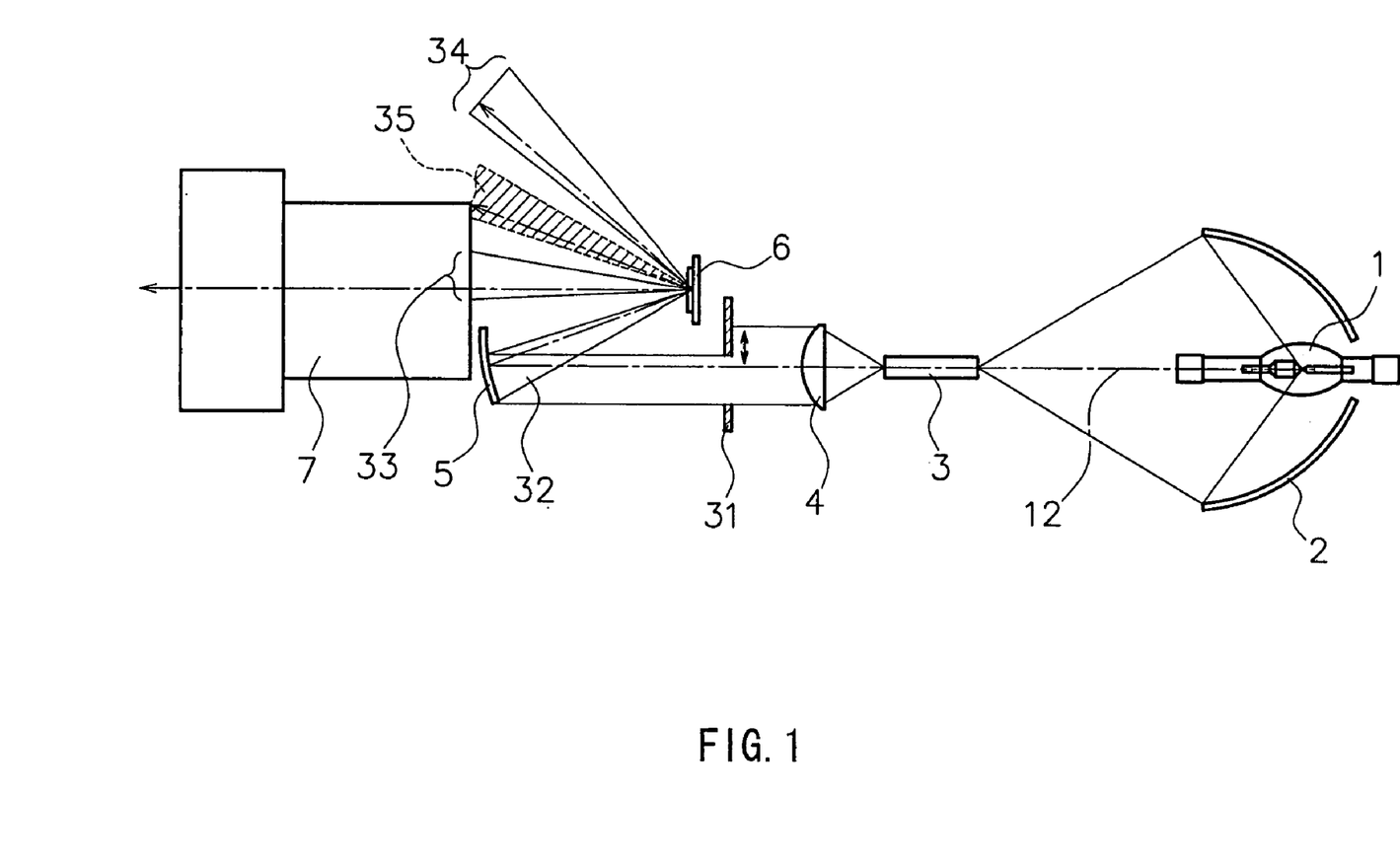
FIG. 1 shows a schematic configuration of a projection-type display apparatus according to a first embodiment of the present invention.

FIG. 1 shows a schematic configuration of a projection-type display apparatus according to a first embodiment of the present invention. In this figure, numeral 1 denotes a lamp serving as a light source, numeral 31 denotes a diaphragm, numeral 6 denotes a reflecting light valve, and numeral 7 denotes a projection lens. Also, an optical system constituted by a concave mirror 2, a rod prism 3, a condenser lens 4 and a focusing mirror 5 is collectively called an illuminating optical system. Numeral 12 indicates an optical axis of the illuminating optical system.

The reflecting light valve 6 serving as an image forming member has mirror elements 21 formed in a matrix pattern, each of which corresponds to a pixel, controls a traveling direction of light according to a video signal and forms an optical image by a change in a reflection angle as described referring to FIG. 10. The concave mirror 2 is an elliptical surface mirror that has a reflecting surface with an elliptical cross-section, and has a first focus and a second focus.

A xenon lamp may be used as the lamp 1, which is disposed so that the center of its light-emitting body is in the vicinity of the first focus of the concave mirror 2, and the rod prism 3 is disposed so that its light entrance surface is in the vicinity of the second focus of the concave mirror 2. In addition, the concave mirror 2 may be obtained by forming on an inner surface of a glass base an optical multilayer film that transmits infrared light and reflects visible light.

The rod prism is a quadratic prism whose light entrance and exit surfaces have the same aspect ratio as an effective display surface of the reflecting light valve 6, and may be made of quartz glass, which has an excellent heat resistance, because it is to be disposed at a position on which radiant light from the lamp 1 is focused. The light-emitting body image of the lamp 1 focused by the concave mirror 2 is formed near the entrance surface of the rod prism 3. The light-emitting body image of the lamp 1 focused by the concave mirror 2 is brightest near the center, which is close to the optical axis 12, and rapidly becomes darker toward the periphery, and thus there is brightness ununiformity within the surface.

On the other hand, since a flux of rays that has entered the rod prism 3 is subjected to multiple reflections by a side surface of the rod prism 3 so that the light-emitting body image is finely divided and overlapped as much as the number of reflected times and then illuminated, uniform brightness is achieved at the exit surface of the rod prism 3. In this manner, the effects of fine division and overlapping of the light-emitting body image of the lamp improve the uniformity in keeping with an increase in the number of times of reflections in the rod prism 3. Thus, the degree of uniformity depends on the length of the rod prism 3. In the present embodiment, the length of the rod prism 3 was designed such that a peripheral illuminance is at least 90% of a central illuminance on the screen.

The exit surface of the rod prism 3 where the brightness has been made uniform as above is used as a secondary surface light source to form an image under a magnification that matches an effective display area of the reflecting light valve 6 by the subsequent condenser lens 4 and focusing mirror 5, making it possible to both secure a light focusing efficiency and improve the uniformity. The light emitted from the lamp 1 is focused by the illuminating optical system, and illuminating light 32 enters the reflecting light valve 6.

ON light 33 corresponding to the white display in the illuminating light 32 that has entered the reflecting light valve 6 enters the projection lens 7 and then is magnified and projected onto a screen (not shown). On the other hand, OFF light 34 corresponding to the black display travels outside an effective diameter of the projection lens 7 and does not reach the screen.

Figure 2:
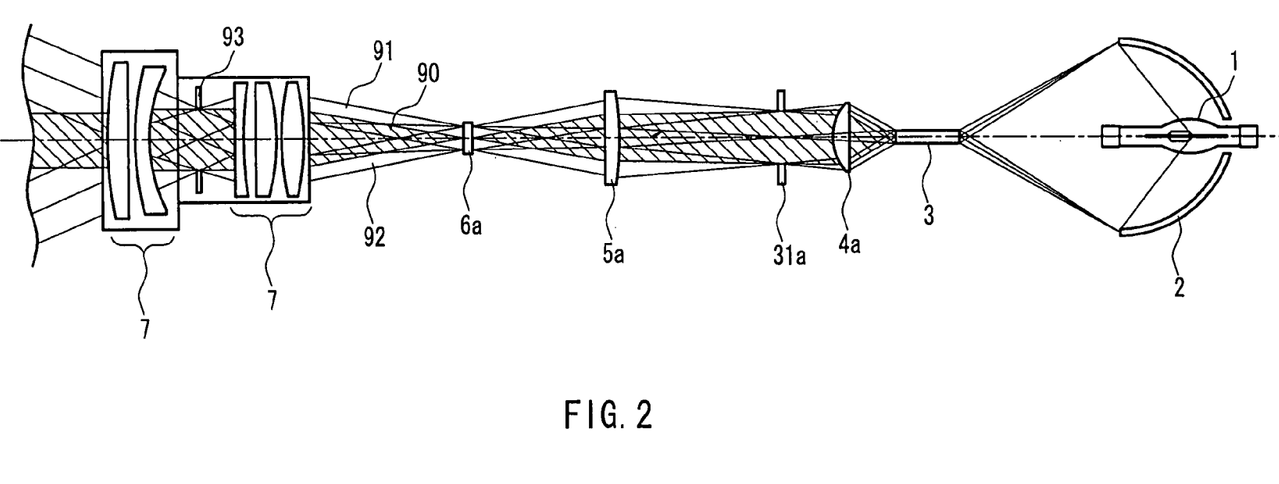
FIG. 2 shows a schematic configuration for describing diaphragm positions according to an embodiment of the present invention.

In the following, the positional relationship of optical members will be described more specifically referring to FIG. 2. The projection-type display apparatus in FIG. 2 is shown as a view developed such that the optical axis in the configuration of FIG. 1 lies on the same line for facilitating understanding of the positional relationship of the optical members.

In other words, the focusing mirror 5 as a reflecting element in the configuration shown in FIG. 1 is replaced by a lens 5a as a transmitting element, and the reflecting light valve 6 as a reflecting element in FIG. 1 is replaced by a light valve 6a as a transmitting element. In FIG. 2, the flux of rays shown by hatching is an on-axis flux of rays 90, and numerals 91 and 92 each indicates an off-axis flux of rays.

The light-emitting body image of the lamp 1 is formed on the entrance surface of the rod prism 3 by the elliptical surface mirror 2. The light passing through the rod prism 3 repeatedly is subjected to multiple reflections on an inner surface of the rod prism 3, so that its brightness is made uniform on an exit surface side.

When the exit surface of the rod prism 3 is a secondary surface light source image, this light source image is formed on the light valve 6a by the lenses 4a and 5a and further formed on the screen (not shown) by the projection lens 7. In other words, the exit surface of the rod prism 3 and an optical image formation surface of the light valve 6a are in a conjugate relationship, and the optical image formation surface of the light valve 6a and a screen surface also are in a conjugate relationship.

On the other hand, a diaphragm 31a corresponds to the diaphragm 31 in FIG. 1 and is disposed between a lens 4a and the lens 5a on an optical path of the illuminating optical system. A diaphragm 93 is disposed in the projection lens 7. The diaphragm 31a and the diaphragm 93 are aperture stops for determining the size of cross-sections of the on-axis flux of rays 90, the off-axis flux of rays 91 and the off-axis flux of rays 92. The diaphragm 93 is disposed at a position of an entrance pupil of the projection lens 7, and the diaphragm 31a is disposed at a substantially conjugate position of the diaphragm 93.

Figure 5:
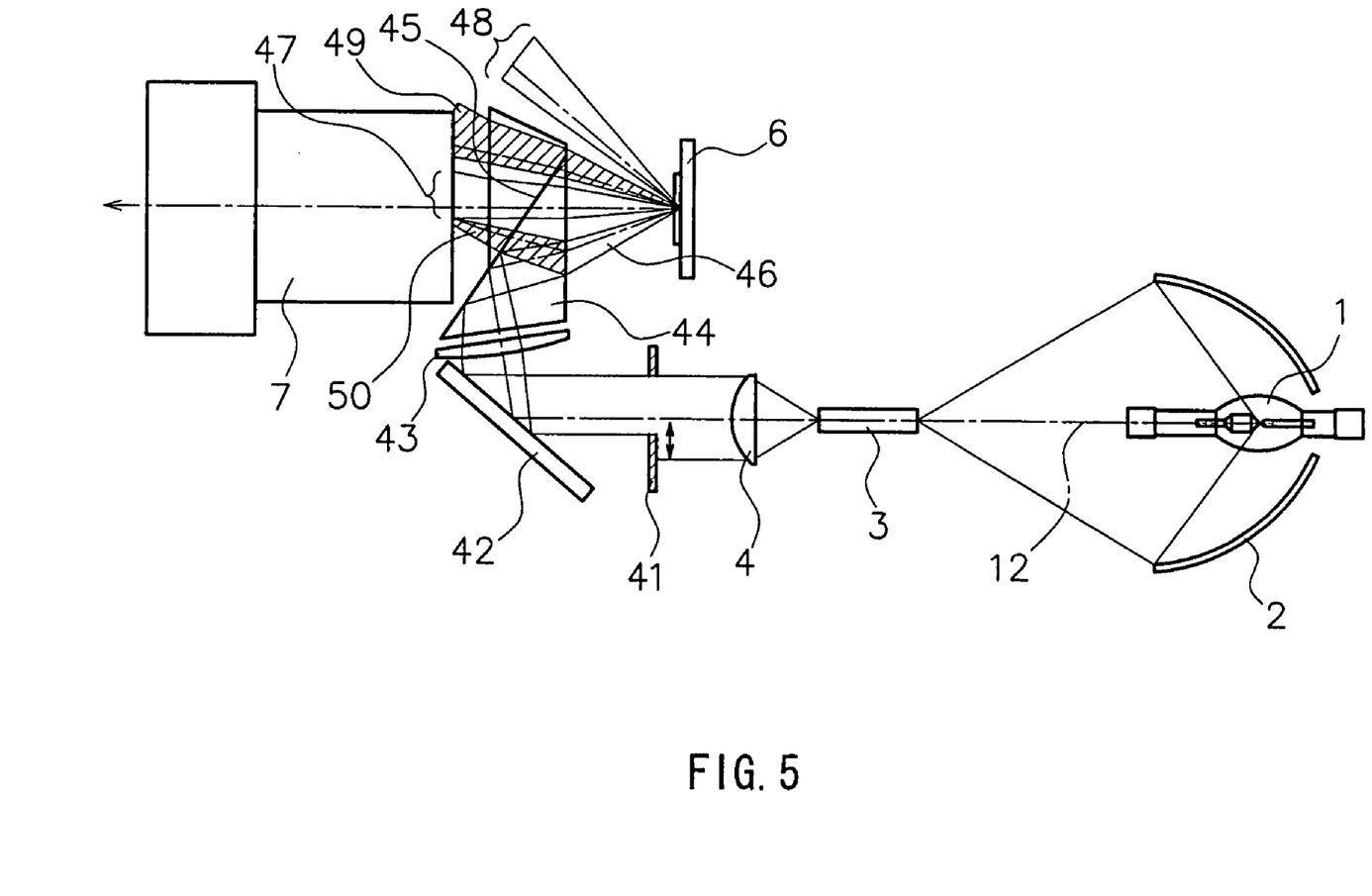
FIG. 5 shows a schematic configuration of a projection-type display apparatus according to a second embodiment of the present invention.

Incidentally, although the optical axis does not lie on the same line in the configurations of FIG. 1 and FIG. 5 and thereafter according to respective embodiments, conjugate relationships similar to those in FIG. 2 are achieved. Further, in these figures, the off-axis flux of rays is omitted for describing an effect of unwanted light.

Figure 3A:
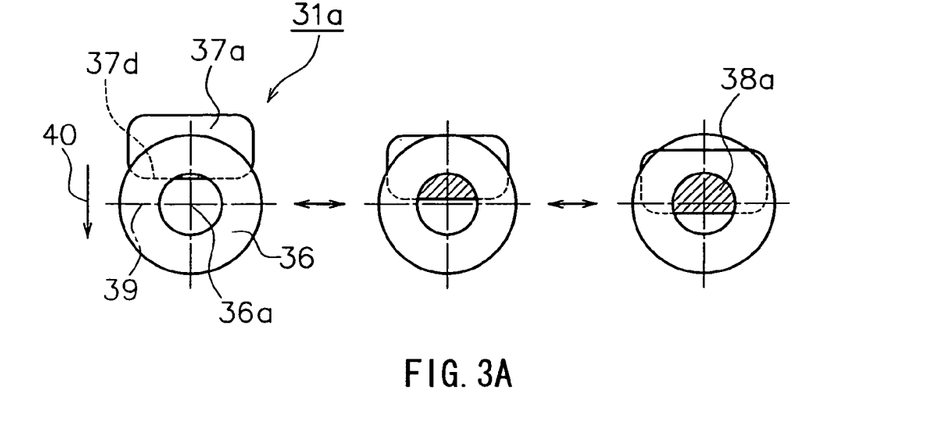
FIG. 3A shows a schematic configuration of a first diaphragm according to an embodiment of the present invention.
Figure 3B:
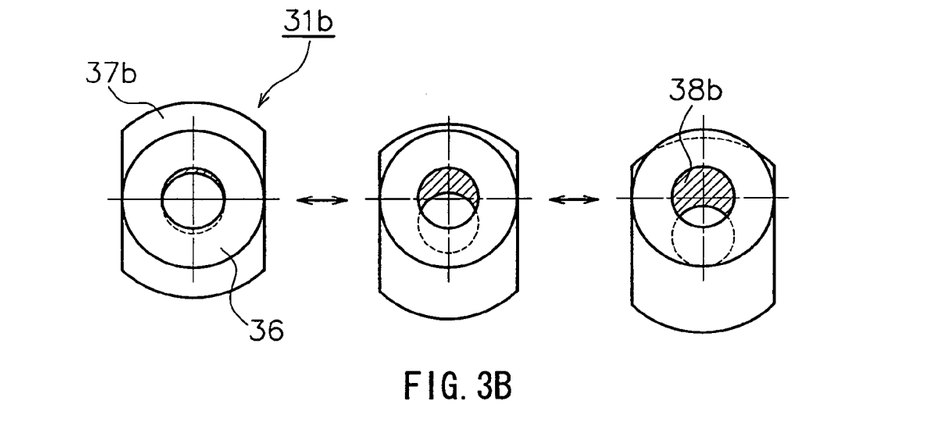
FIG. 3B shows a schematic configuration of a second diaphragm according to an embodiment of the present invention.
Figure 3C:
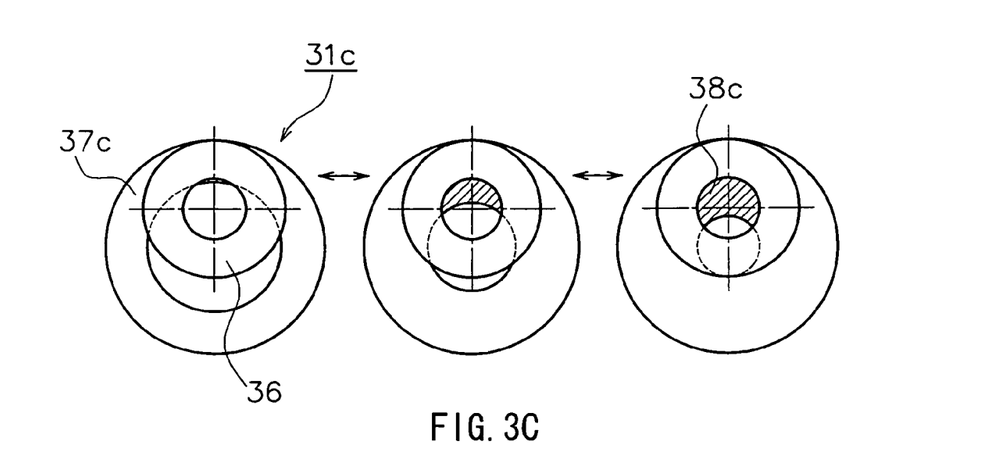
FIG. 3C shows a schematic configuration of a third diaphragm according to an embodiment of the present invention.

FIGS. 3A to 3C illustrate specific examples of the diaphragm 31 shown in FIG. 1. In each figure, a fixed diaphragm 36 has an opening through which light passes, and its position to be disposed and its opening shape are fixed. The diaphragm is constituted by a combination of this fixed diaphragm 36 and a light-shielding plate 37a, 37b or 37c serving as a light-shielding member.

The light-shielding member according to the present embodiment can be displaced by a moving system, whereby a light-shielding area can be changed. This displacement of the light-shielding member includes movement of the position of the light-shielding member and a change in shape of the light-shielding member itself such as a change in an opening area of the light-shielding member.

The diaphragm 31a shown in FIG. 3A includes the fixed diaphragm 36 and the light-shielding plate 37a serving as the light-shielding member. In this figure, a part of the opening of the fixed diaphragm 36 is shielded by the light-shielding plate 37a. The hatched portion is a shielded portion (for example, a portion indicated by numeral 38a in the right end figure; the same applies to numerals 38b and 38c in FIGS. 3B and 3C).

As shown in this figure, the light-shielding area increases with a lowering of the light-shielding plate 37a. The light-shielding plate 37a has a side 37d, which is a straight line parallel with a horizontal line 39 passing through a center 36a of the opening of the fixed diaphragm 36 (a point on the optical axis 12 in FIG. 1). Accordingly, the shielded portion surrounded by the side 37d and an internal circumference of the opening of the fixed diaphragm has a substantially part-circular shape. This remains the same while the light-shielding plate 37a is moved downward, and the shielded portion achieves a complete semi-circular shape when the side 37d and the horizontal line 39 match.

With regard to the diaphragm 31b shown in FIG. 3B, the light-shielding plate 37b serving as the light-shielding member is provided with an opening. In the example of this figure, the light-shielding area also changes with a downward movement of the light-shielding plate 37b as in the example of FIG. 3A. In other words, an increase in the distance between centers of the opening of the light-shielding plate 37b and the opening of the fixed diaphragm 36 enlarges the light-shielding area. In the example shown in this figure, the shielded portion surrounded by the internal circumference of the opening of the light-shielding plate 37b and that of the opening of the fixed diaphragm 36 has a substantially crescent shape.

With regard to the diaphragm 31c shown in FIG. 3C, the light-shielding plate 37c serving as the light-shielding member is provided with an opening. The diameter of the opening of the light-shielding plate 37c can be changed so as to change the light-shielding area. In other words, as shown in this figure, a decrease in the opening diameter of the light-shielding plate 37c enlarges the light-shielding area. In the example shown in this figure, the shielded portion surrounded by the internal circumference of the opening of the light-shielding plate 37c and that of the opening of the fixed diaphragm 36 also has a substantially crescent shape as in the example of FIG. 3B.

When the diaphragm 31a shown in FIG. 3A is taken as an example, in the case where the side 37d of the light-shielding plate 37a is located above the opening of the fixed diaphragm 36, the light-shielding area is zero. In this case, the illuminating light 32 and unwanted reflection light 35 generated at an interface of the cover glass of the reflecting light valve 6 come closest to each other in FIG. 1. In other words, in this case, the largest amount of unwanted reflection light enters the projection lens 7.

When shielding light, the light-shielding area changes along the movement of the light-shielding plate 37a in a direction indicated by an arrow 40. In other words, moving the lower side 37d from a reference position toward the optical axis 12 and keeping it moving in this direction enlarges the light-shielding area continuously, so that the opening of the fixed diaphragm 36 is shielded gradually downward, where the reference position is a position of the light-shielding member at which the periphery of the illuminating light 32 and that of the reflection light 35 come closest to each other. Also, in the state where the shielded portion is formed, moving the lower side 37d in a direction facing opposite to the arrow 40 reduces the light-shielding area, so that the opening of the fixed diaphragm 36 is opened in one direction.

By the movement in the direction indicated by the arrow 40, the unwanted reflection light 35 in FIG. 1 is cut gradually from the side of the optical axis. In other words, although the movement of the lower side 37d of the light-shielding plate 37a in the direction indicated by the arrow 40 enlarges the light-shielding area, the shielded portion enlarges gradually from the top of the fixed diaphragm 36 and the lower portion of the opening of the fixed diaphragm 36 remains open because the shape of the shielded portion is rotationally asymmetric to the optical axis.

Accordingly, shielding of necessary light can be better avoided compared with a diaphragm for changing the light-shielding area in a rotationally symmetric manner, for example, a diaphragm for narrowing the opening concentrically, making it possible to improve contrast performance while minimizing brightness reduction.

As the moving system for moving the light-shielding plate, it is appropriate to use a structure in which the light-shielding plate is attached to a rotational shaft of a motor via a gear so that the light-shielding plate is displaced relative to the rotation of the motor, for example. In this case, the light-shielding area may be controlled by controlling the rotation of the rotational shaft so as to stop the light-shielding plate at a desired position.

The light-shielding area is enlarged by moving the entire light-shielding plate in the examples of FIGS. 3A and 3B, whereas the light-shielding area is enlarged by changing the opening area of the light-shielding plate 37c while the light-shielding plate 37c is being fixed in the example of FIG. 3C. The mechanisms of the light-shielding plate 37c with a changeable opening area and the moving system may be those similar to an iris diaphragm, for example.

Furthermore, it is desired that the material for the light-shielding plates 37a to 37c shown in FIG. 3 have a surface reflectance of at least 80%. The reason is that, since light with a high energy enters the shielded portion, as more light is absorbed in the surface of the shielded portion, an increase in the light-shielding area raises the temperature of the shielded portion, so that radiant heat may damage peripheral optical components.

In the present embodiment, an aluminum plate with a mirror-finished surface whose reflectance was about 88% was used. However, there is no particular limitation to the above, and an article of metal such as stainless steel with a mirror-finished surface or a mirror element obtained by forming a dielectric multilayer film on the surface of a base also may be used.

Figure 4A:
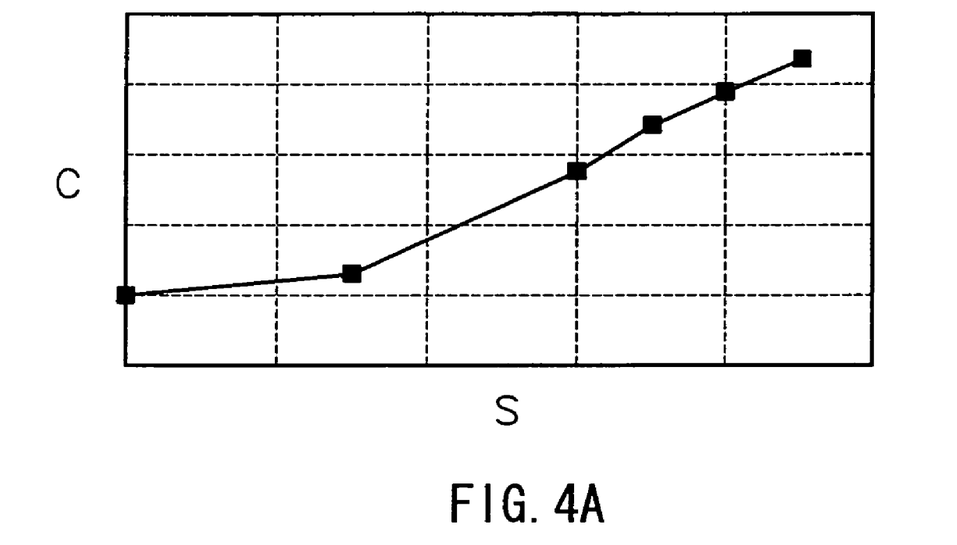
FIG. 4A shows a relationship between a light-shielding amount of a diaphragm and a contrast ratio in a projection-type display apparatus according to an embodiment of the present invention.
Figure 4B:
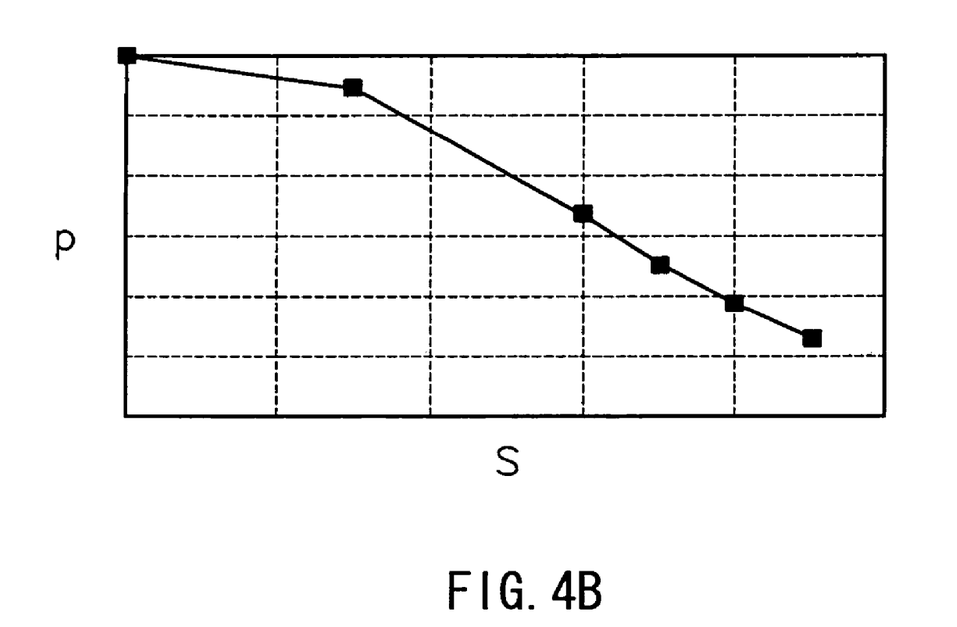
FIG. 4B shows a relationship between the light-shielding amount of the diaphragm and an optical output in the projection-type display apparatus according to an embodiment of the present invention.

FIGS. 4A and 4B are graphs showing the relationship between a light-shielding amount of a diaphragm and a projected image performance in the projection-type display apparatus according to the present embodiment. FIG. 4A shows the relationship between the light-shielding amount of the diaphragm (the axis of abscissa S) and a contrast ratio (the axis of ordinate C), while FIG. 4B shows the relationship between the light-shielding amount of the diaphragm (the axis of abscissa S) and an optical output relative value (the axis of ordinate P). As these graphs indicate, an increase in the light-shielding amount of the diaphragm S raises the contrast ratio C and lowers the optical output P. In other words, the contrast ratio and the optical output of the projected image with respect to the light-shielding amount of the diaphragm are in a reciprocal relationship.

Accordingly, it is appropriate to provide an input means outside the apparatus and a control system for controlling the displacement amount by the moving system so that the light-shielding area of the diaphragm can be controlled from outside of the apparatus by remote control. With this configuration, the balance between the contrast and the optical output can be designed suitably as necessary.

For instance, in the example of FIG. 3A, moving the light-shielding plate 37a in the direction indicated by the arrow 40 can enlarge the light-shielding area, which lowers the optical output but improves the contrast. Conversely, moving the light-shielding plate 37a in the direction facing opposite to the arrow 40 can enlarge the opening of the diaphragm, which lowers the contrast but improves the optical output. With this configuration, it is possible to select suitably a projected image in which the brightness is important or that in which the contrast is important according to an intended use.

Moreover, using the above-described control system, the light-shielding area of the diaphragm may be controlled automatically according to the level of the video signal. For example, by giving priority to the contrast and the higher level of black in darker scenes and giving priority to the higher level of white in brighter scenes, it is possible to obtain a display performance with enhanced contrast.

Second Embodiment

FIG. 5 shows a schematic configuration of a projection-type display apparatus according to a second embodiment of the present invention. In this figure, the lamp 1 serving as a light source, the reflecting light valve 6 and the projection lens 7 are equivalent to those shown in FIG. 1. Also, an optical system constituted by a concave mirror 2, a rod prism 3, a condenser lens 4, a reflecting mirror 42, a field lens 43 and a total reflection prism 44 is collectively called an illuminating optical system.

The concave mirror 2, the rod prism 3 and the condenser lens 4 have the same effects as in the embodiment described referring to FIG. 1, and therefore, the description thereof will be omitted. In the present embodiment, light that has left the condenser lens 4 travels via the reflecting mirror 42 and the field lens 43 and reaches the total reflection prism 44.

Here, the effect of the total reflection prism 44 will be described. The total reflection prism 44 is constituted by two prisms, and a very thin air layer 45 is formed between their adjacent surfaces. The angle of the air layer 45 is designed so that illuminating light 46 entering the air layer 45 at an angle of at least a critical angle is totally-reflected and enters the reflecting light valve 6 obliquely, and ON light 47 as a projected image enters the air layer 45 at an angle of not greater than the critical angle, passes therethrough and reaches the projection lens 7. By designing the total reflection prism 44 in an optical path of the illuminating optical system as described above, a compact illuminating optical system can be constructed.

The ON light 47 corresponding to a white display in the illuminating light 46 that has entered the reflecting light valve 6 passes through the total reflection prism 44 and the projection lens 7 and then is magnified and projected onto a screen (not shown). On the other hand, OFF light 48 corresponding to a black display travels outside an effective diameter of the projection lens 7 and does not reach the screen.

In the present embodiment, not only first unwanted reflection light 49 generated at an interface of a cover glass of the reflecting light valve 6, but also second unwanted reflection light 50 generated at an interface on the reflecting light valve 6 side of the total reflection prism 44 affects the contrast performance of the projected image. In this case, the degree of influence of the first unwanted reflection light 49 and the second unwanted reflection light 50 that enter the projection lens 7 also can be changed suitably by a diaphragm 41 whose light-shielding area can be changed.

The shape of the opening of the diaphragm 41 also can be changed by using the mechanism illustrated in FIG. 3 as in the first embodiment. Stopping down and opening by the change in the shielded portion are similar to those in the first embodiment, that is, moving the light-shielding member from the reference position toward the optical axis 12 and keeping it moving in this direction enlarges the light-shielding area continuously, so that the opening of the diaphragm 41 is shielded gradually from one side. Also, in the state where the shielded portion is formed, moving the light-shielding member in the opposite direction reduces the light-shielding area, so that the opening of the diaphragm 41 is opened in one direction.

Figure 6:
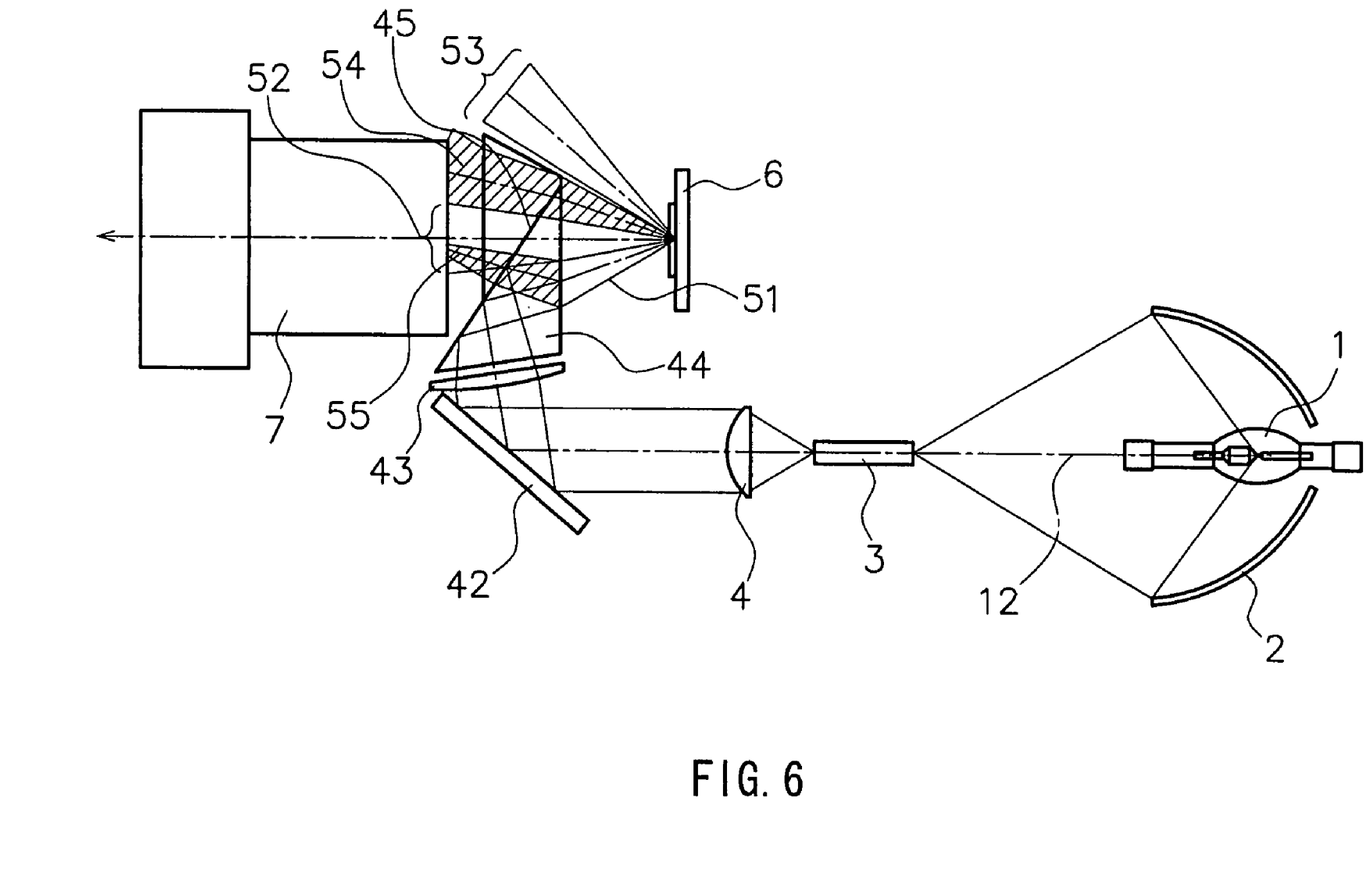
FIG. 6 shows a schematic configuration of a projection-type display apparatus without a diaphragm according to a comparative example.

FIG. 6 shows a schematic configuration of a projection-type display apparatus according to a comparative example of the embodiment shown in FIG. 5. In the comparative example shown in FIG. 6, the diaphragm 41 is not provided, or the opening of the diaphragm 41 is open. In this case, after illuminating light 51 enters the reflecting light valve 6, ON light 52 corresponding to the white display passes through the total reflection prism 44 and the projection lens 7 and then is magnified and projected onto the screen (not shown). On the other hand, OFF light 53 corresponding to the black display travels outside the effective diameter of the projection lens 7 and does not reach the screen.

Further, first unwanted reflection light 54 and second unwanted reflection light 55 both cause the deterioration of the contrast performance of the projected image. When the embodiment of FIG. 5 and the comparative example of FIG. 6 are compared, it can be seen that ray fluxes of the first unwanted reflection light 49 and the second unwanted reflection light 50 shown in FIG. 5 are thinner than those of the first unwanted reflection light 54 and the second unwanted reflection light 55 shown in FIG. 6 because a part of the opening of the fixed diaphragm is shielded using the diaphragm 41 in FIG. 5.

As described above, in the embodiment of FIG. 5, both of the first unwanted reflection light 49 and the second unwanted reflection light 50 can be cut by the diaphragm 41 more effectively than in the comparative example shown in FIG. 6. In other words, shielding of necessary light can be better avoided compared with a diaphragm for changing the shielded area in a rotationally symmetric manner, for example, a diaphragm for narrowing the opening concentrically, making it possible to improve contrast performance while minimizing brightness reduction.

In addition, the arrangement of the diaphragm 41 and the material for the light-shielding plate are similar to those in the first embodiment. Furthermore, similarly to the first embodiment, it is preferable that the light-shielding area of the diaphragm can be controlled from an outside of the set by remote control and that the light-shielding area can be controlled according to a video signal. Additionally, although the change in the light-shielding area of the diaphragm 41 has been described by the example of moving the light-shielding member, the opening of the light-shielding member may be changed as in the structure of FIG. 3C.

Third Embodiment

Figure 7:
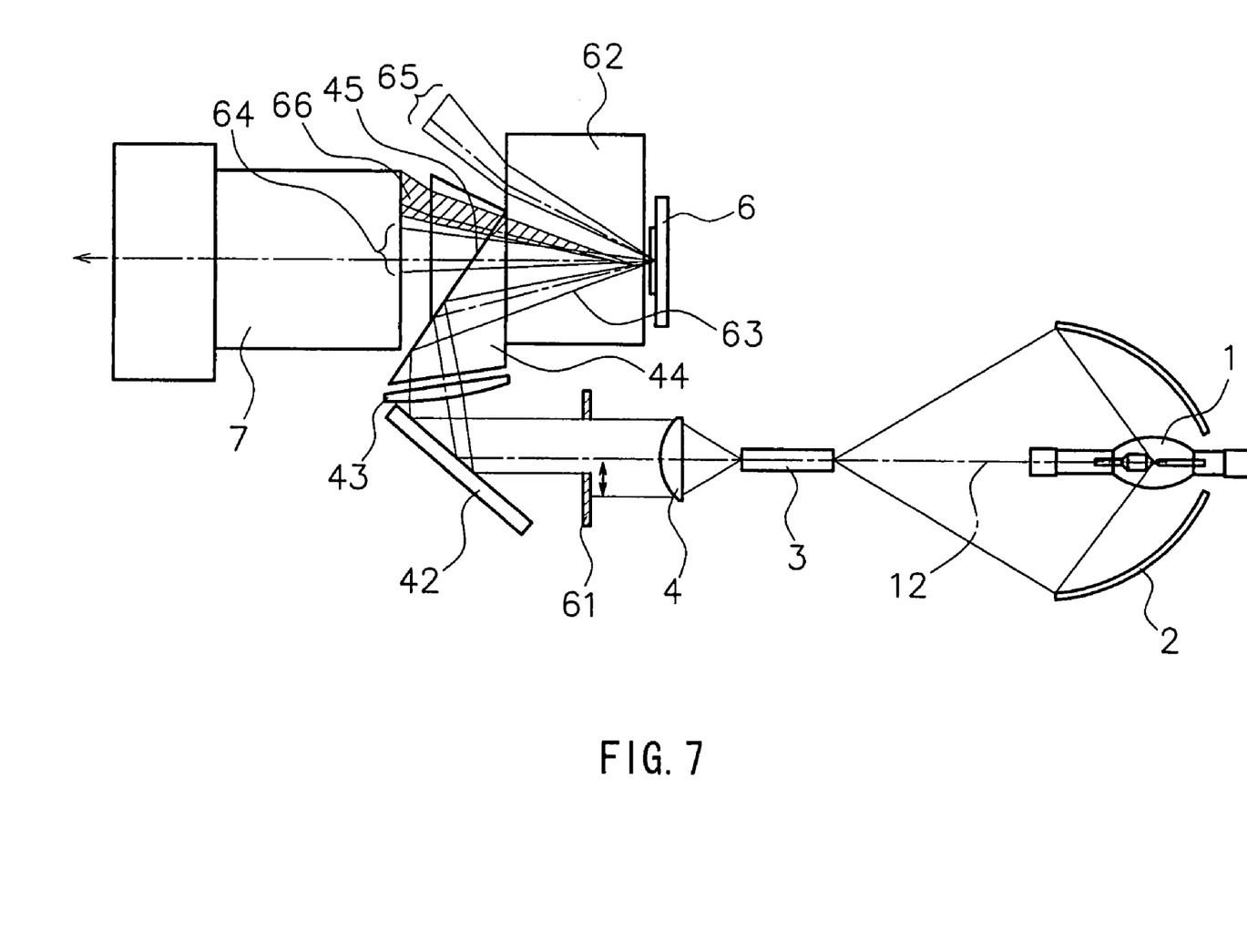
FIG. 7 shows a schematic configuration of a projection-type display apparatus according to a third embodiment of the present invention.

FIG. 7 shows a schematic configuration of a projection-type display apparatus according to a third embodiment of the present invention. In this figure, the lamp 1 serving as a light source, the reflecting light valve 6 and the projection lens 7 are equivalent to those shown in FIG. 1. Also, as in FIG. 5, a system constituted by a concave mirror 2, a rod prism 3, a condenser lens 4, a reflecting mirror 42, a field lens 43 and a total reflection prism 44 is collectively called an illuminating optical system.

The concave mirror 2, the rod prism 3 and the condenser lens 4 have the same effects as in the embodiment described referring to FIG. 1, and therefore, the description thereof will be omitted. In the present embodiment, a color separation/combination prism 62 is disposed between the total reflection prism 44 and the reflecting light valve 6, and three reflecting light valves 6 are used.

Figure 8:
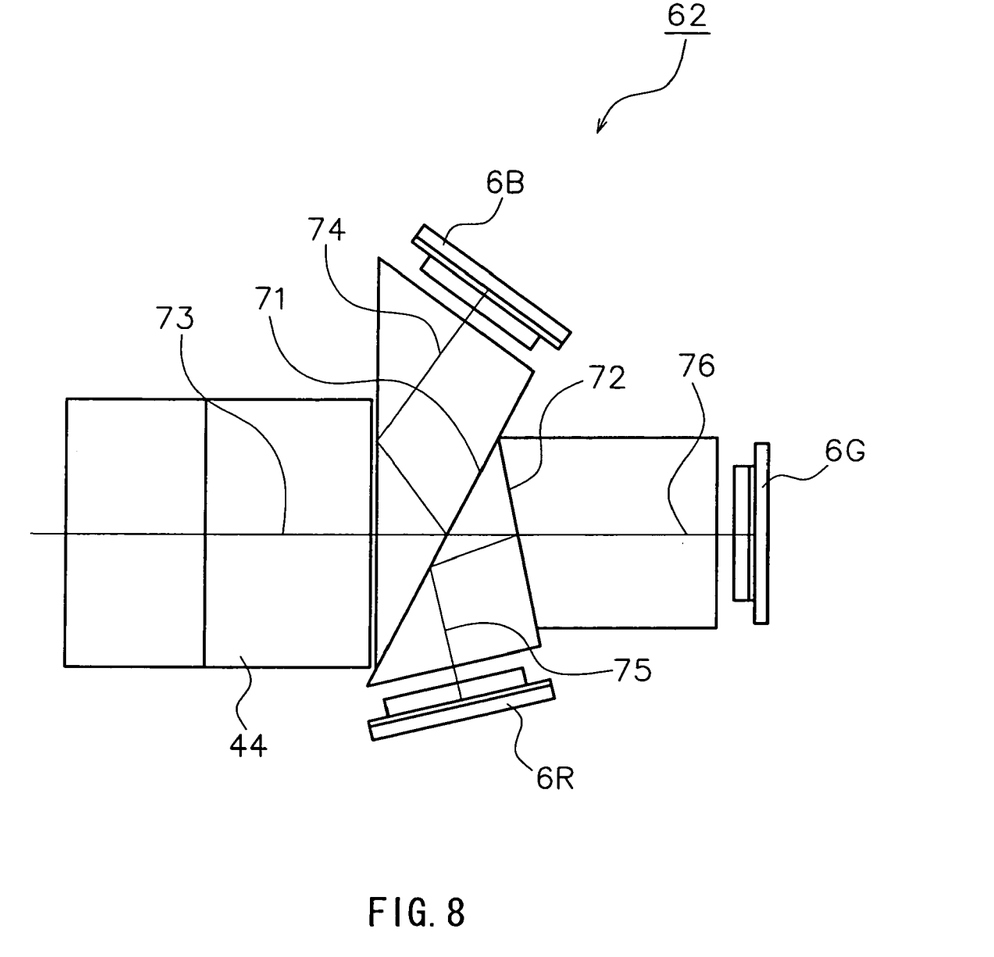
FIG. 8 shows a structure of a color separation/combination prism according to the third embodiment of the present invention.

In the following, the structure and effect of the color separation/combination prism 62 will be described referring to FIG. 8. FIG. 8 is a horizontal sectional view showing the color separation/combination prism 62 shown in FIG. 7. The color separation/combination prism 62 is constituted by three prisms, and the contact surfaces thereof are provided with a first dichroic mirror 71 and a second dichroic mirror 72. In the case of the color separation/combination prism 62 used in the present embodiment, out of light 73 that has entered from the total reflection prism 44, only blue light is reflected first by the first dichroic mirror 71 so that blue light 74 is generated and enters a blue-reflecting light valve 6B.

Next, only red light is reflected by the second dichroic mirror 72 so that red light 75 is generated and enters a red-reflecting light valve 6R. Then, green light 76 that has passed through both the first dichroic mirror 71 and the second dichroic mirror 72 enters a green-reflecting light valve 6G. These three colors of light are reflected by their corresponding reflecting light valves 6B, 6R and 6G and then combined into one again by the first dichroic mirror 71 and the second dichroic mirror 72, so as to enter the total reflection prism 44.

As described above, white light is separated into three primary colors of red, blue and green and then combined, and three reflecting light valves 6B, 6R and 6G corresponding to respective video signals are used, thereby displaying a high-resolution full-color projected image. ON light 64 corresponding to the white display in illuminating light 63 that has entered the reflecting light valve 6 shown in FIG. 7 passes through the color separation/combination prism 62, the total reflection prism 44 and the projection lens 7 and then is magnified and projected onto a screen (not shown). On the other hand, OFF light 65 corresponding to the black display travels outside an effective diameter of the projection lens 7 and does not reach the screen.

In the present embodiment, not only the unwanted reflection light generated at the interface of the cover glass of the reflecting light valve 6 as shown in FIGS. 1 and 5 and the unwanted reflection light generated at the interface on the reflecting light valve 6 side of the total reflection prism 44 as shown in FIG. 5 (both are not shown in FIG. 7), but also unwanted reflection light 66 generated at an interface of the color separation/combination prism affects the contrast performance of the projected image.

In this case, the degree of influence of the unwanted reflection light 66 that enters the projection lens 7 also can be changed suitably by a diaphragm 61 whose light-shielding area can be changed. The shape of the opening of the diaphragm 61 can be changed by using the mechanism illustrated in FIG. 2 as in the first embodiment. Stopping down and opening by the change in the shielded portion are similar to those in the first embodiment, that is, moving the light-shielding member from the reference position toward the optical axis 12 and keeping it moving in this direction enlarges the light-shielding area continuously, so that the opening of the diaphragm 61 is shielded gradually from one side. Also, in the state where the shielded portion is formed, moving the light-shielding member in the opposite direction reduces the light-shielding area, so that the opening of the diaphragm 61 is opened in one direction.

Figure 9:
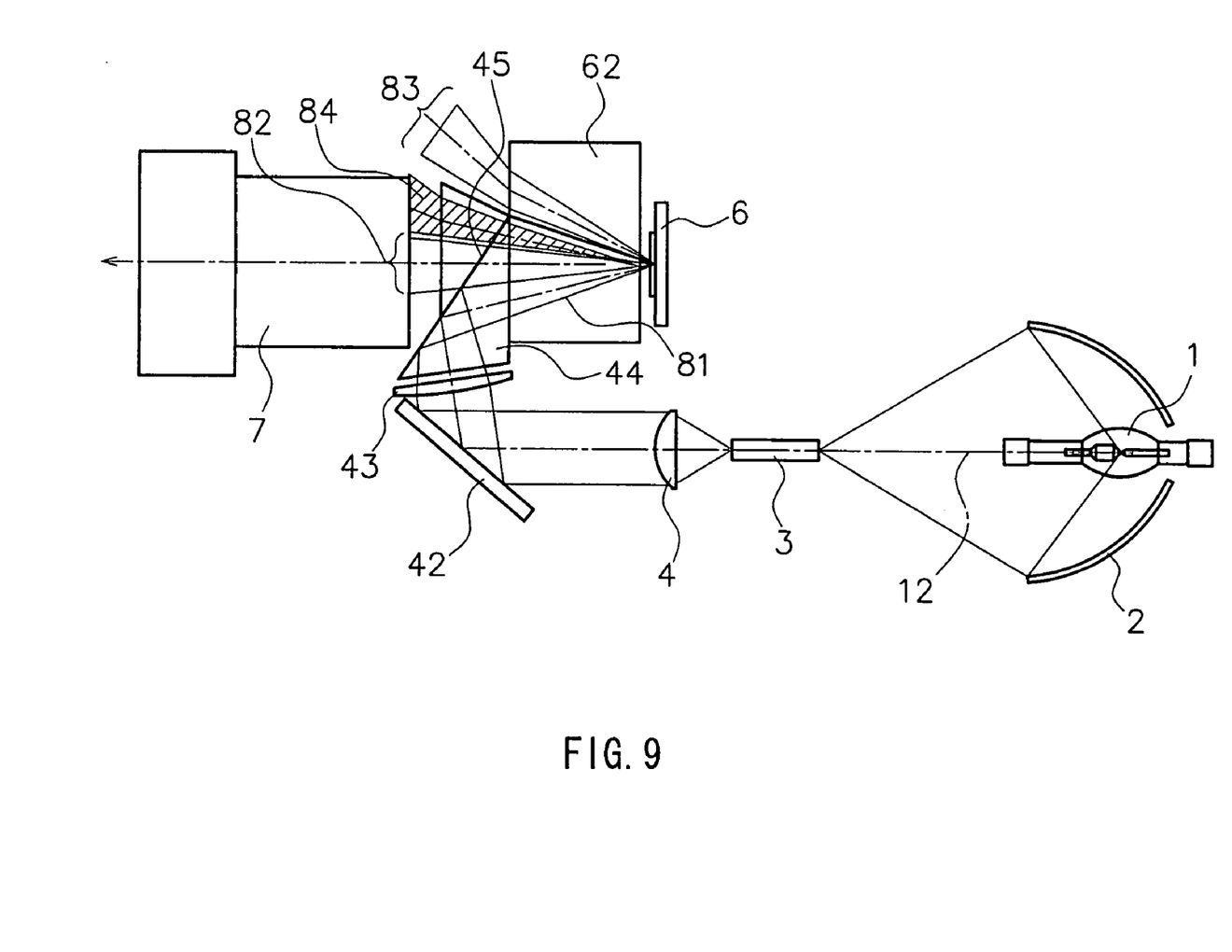
FIG. 9 shows a schematic configuration of a projection-type display apparatus without a diaphragm according to a comparative example.

FIG. 9 shows a schematic configuration of a projection-type display apparatus according to a comparative example of the embodiment shown in FIG. 7. In the comparative example shown in FIG. 9, the diaphragm 61 is not provided, or the opening of the diaphragm is open. In this case, after illuminating light 81 enters the reflecting light valve 6, ON light 82 corresponding to the white display passes through the color separation/combination prism 62, the total reflection prism 44 and the projection lens 7 and then is magnified and projected onto a screen (not shown).

On the other hand, OFF light 83 corresponding to the black display travels outside an effective diameter of the projection lens 7 and does not reach the screen. Further, unwanted reflection light 84 causes the deterioration of the contrast performance of the projected image.

Incidentally, although not shown in the figure, the unwanted reflection light generated at the interface of the cover glass of the reflecting light valve 6 and that generated at the interface of the total reflection prism 44 also have an influence similar to those in the cases shown in FIGS. 1 and 5.

When the embodiment of FIG. 7 and the comparative example of FIG. 9 are compared, it can be seen that a ray flux of the unwanted reflection light 66 shown in FIG. 5 is thinner than that of the unwanted reflection light 84 shown in FIG. 9 because a part of the opening of the fixed diaphragm is shielded using the diaphragm 61 in FIG. 7.

As described above, in the embodiment of FIG. 7, the unwanted reflection light 66 can be cut by the diaphragm 61 more effectively than in the comparative example shown in FIG. 9. In other words, shielding of necessary light can be better avoided compared with a diaphragm for changing the shielded area in a rotationally symmetric manner, for example, a diaphragm for narrowing the opening concentrically, making it possible to improve contrast performance while minimizing brightness reduction.

In addition, the arrangement of the diaphragm 61 and the material for the light-shielding plate are similar to those in the first embodiment. Furthermore, similarly to the first embodiment, it is preferable that the light-shielding area of the diaphragm can be controlled from an outside of the set by remote control and that the light-shielding area can be controlled according to a video signal. Additionally, although the change in the light-shielding area of the diaphragm 61 has been described by the example of moving the light-shielding member, the opening of the light-shielding member may be changed as in the structure of FIG. 3C.

Although the above-described embodiments have been directed to the configuration in which the light-shielding area of the diaphragm can be changed in order to adjust the contrast performance and the optical output suitably, it also may be possible to adopt the configuration in which the opening of the diaphragm is fixed to achieve a certain desired contrast performance. In such a configuration, the moving system is not needed, and the shape of the opening is equivalent to a remaining shape after removing the shielded portion (hatched portion) from the opening in the fully opened state in the examples of FIGS. 3A to 3C.

In other words, the shape of the fixed opening is equivalent to a shape obtained by shielding a portion that is rotationally asymmetric to the optical axis such as a substantially part-circular shape or a substantially crescent shape over the opening in the fully opened state. In this case, since the portion corresponding to the shielded portion has a shape that is rotationally asymmetric to the optical axis, the shape of the fixed opening also is rotationally asymmetric to the optical axis.

Although the diaphragms are provided at a substantially conjugate position of the entrance pupil of the projection lens in the optical path of the illuminating optical system in the above-described embodiments, they also may be disposed directly at the entrance pupil of the projection lens to obtain a similar effect.

Furthermore, the diaphragms used in the above-described embodiments are most effective for light valves on which an optical image is formed by controlling the traveling direction of light according to a video signal such as the reflecting light valve shown in FIG. 11. However, there is no particular limitation to such reflecting light valves, and the effect of reducing the unwanted reflection light can be obtained as long as it is a reflecting light valve having a transparent glass or plastic sheet on an exit side of its image formation surface. For example, a light valve of a type in which a liquid crystal or the like is used as a modulating material and an optical image is formed based on changes in a polarization state, a diffraction state or a scattering state of light.

INDUSTRIAL APPLICABILITY

As described above, according to the present invention, the shape of the portion shielded by the light-shielding member is made rotationally asymmetric to the optical axis of the illuminating optical system, making it possible to improve contrast performance while suppressing shielding of necessary light so as to minimize brightness reduction, which can be applied to a projection-type display apparatus that magnifies an optical image formed on a light valve and projects it onto a screen.

The invention claimed is:

1. A projection-type display apparatus comprising:
   a light source;
   a reflecting light valve having a mirror element for each pixel;
   an illuminating optical system for focusing a radiant light from the light source onto the reflecting light valve;
   a projection lens for magnifying and projecting the radiant light that is reflected by the mirror element of the reflecting light valve; and
   a diaphragm that is disposed at one of a position in the projection lens and a position in the illuminating optical system and regulates a size of a cross-section of a flux of rays of the light projected by the projection lens;
   wherein the diaphragm is constituted by a fixed diaphragm having an opening and a light-shielding plate capable of partly shielding the flux of rays at the opening,
   the light-shielding plate is constituted so as to be displaceable toward an optical axis of the illuminating optical system or an optical axis of the projection lens for reducing a projection of reflection light reflected by a front surface of the reflecting light valve onto the screen, and
   a shape of the opening except for a part shielded by the light-shielding plate is rotationally asymmetric to the optical axis of the illuminating optical system or the projection lens.

* * * * *